United States Patent [19]

Spear et al.

[11] Patent Number: 5,397,215
[45] Date of Patent: Mar. 14, 1995

[54] FLOW DIRECTING ASSEMBLY FOR THE COMPRESSION SECTION OF A ROTARY MACHINE

[75] Inventors: David A. Spear, Manchester; Bruce P. Biederman, Meriden, both of Conn.

[73] Assignee: United Technologies Corporation, Hartford, Conn.

[21] Appl. No.: 76,325

[22] Filed: Jun. 14, 1993

[51] Int. Cl.⁶ .................. F01D 5/22; F01D 9/02
[52] U.S. Cl. .................. 415/191; 415/210.1; 415/914; 416/193 A
[58] Field of Search ............ 415/181, 191, 208.1, 415/210.1, 914; 416/193 A, 234, 239

[56] References Cited

U.S. PATENT DOCUMENTS

| | | |
|---|---|---|
| 2,735,612 | 2/1956 | Hausmann . |
| 2,846,137 | 8/1958 | Smith, Jr. . |
| 2,869,820 | 1/1959 | Marchant et al. . |
| 2,918,254 | 12/1959 | Hausamann . |
| 2,934,150 | 4/1960 | Fink . |
| 2,955,747 | 10/1960 | Schwaar . |
| 2,974,858 | 3/1961 | Koffel et al. . |
| 2,991,929 | 7/1961 | Stalker . |
| 3,692,425 | 9/1972 | Erwin ................................. 415/181 |
| 3,989,406 | 11/1976 | Bliss ................................... 415/181 |
| 3,993,414 | 11/1976 | Meauze et al. ...................... 415/181 |
| 4,194,869 | 3/1980 | Corcokios ........................... 415/191 |
| 4,371,311 | 2/1983 | Walsh . |
| 4,677,828 | 7/1987 | Matthews et al. .................... 60/751 |
| 4,732,538 | 3/1988 | Wollenweber et al. . |
| 4,804,311 | 2/1989 | Anderson et al. .................. 415/191 |
| 5,275,531 | 1/1994 | Roberts ............................... 415/914 |

FOREIGN PATENT DOCUMENTS

| | | | |
|---|---|---|---|
| 110505 | 12/1964 | Czechoslovakia ................. 415/181 |
| 996967 | 12/1951 | France ................................ 415/914 |
| 579989 | 8/1931 | Germany . |
| 2815680 | 4/1978 | Germany . |
| 596784 | 1/1948 | United Kingdom ............... 415/914 |

*Primary Examiner*—Edward K. Look
*Assistant Examiner*—James A. Larson
*Attorney, Agent, or Firm*—Gene D. Fleischhauer

[57] ABSTRACT

A flow directing assembly 24, 24a for a rotary machine 10 is disclosed. Various construction details are developed to decrease aerodynamic losses and promote the ease of design. In one particular embodiment, a concave region 58 of an end wall is employed to create convex wall regions 54, 56 upstream and downstream of the concave region.

10 Claims, 5 Drawing Sheets

FLOW DIRECTING ASSEMBLY FOR THE COMPRESSION SECTION OF A ROTARY MACHINE

TECHNICAL FIELD

This invention relates to a rotary machine having a compression section which includes a rotor assembly or a stator assembly. More particularly, this invention relates to an array of airfoils bounded by an inner wall and an outer wall. The invention was developed for use in a compression section which extends axially in the machine but has application to rotary machines of other designs. The compression section is commonly referred to as the compressor or the compressors of the machine.

BACKGROUND OF INVENTION

A gas turbine engine is one example of a rotary machine having an axially extending compression section which is disposed about an axis R of the engine. The gas turbine engine has a combustion section and a turbine section downstream of the compression section. These sections are disposed about the axis R. An annular flowpath for working medium gases extends axially through the sections of the engine.

The working medium gases are compressed and diffused in the compression section. Fuel is mixed with the working medium gases in the combustion section and burned to add energy to the gases. The hot, pressurized gases are expanded through the turbine section to develop propulsive thrust and, through one or more turbines to extract energy from the gases by driving the turbines about the axis of the engine.

A rotor shaft extends axially in the engine to rotatably attach components of the compression section to the turbines. As each turbine is driven about the axis R by the expanding working medium gases, the turbine drives rotating components in the compression section about the axis. These rotating components in the compression section do work on the incoming gases to pressurize the gases.

In a turbofan gas turbine engine, the compression section may have three compressors in axial alignment for increasing the pressure of the incoming gases. The compressors are commonly referred to as the fan compressor, the low pressure compressor, and the high pressure compressor.

Each compressor has an outer wall and an inner wall which bound the working medium flowpath. The rotating components include arrays of rotor blades which extend outwardly across the working medium flowpath into proximity with the outer wall. Alternating with arrays of rotor blades are arrays of compressor vanes. Each compressor vane has an airfoil which extends radially inwardly between the outer wall and the inner wall, across the flowpath for working medium gases. Each airfoil of the vane adjusts the angular velocity component of the working medium gases as the gases exit the rotor stages and before the gases enter the adjacent rotor stage or a diffuser region of the compressor.

Such constructions are very different from turboprop constructions of the type shown in U.S. Pat. No. 2,934,150, issued to Fink entitled "Pressure-Contoured Spinner". Turboprop constructions do not have an outer wall which extends circumferentially about the propeller. And, the aerodynamic design of a propeller is very different from the aerodynamic design of an airfoil for a compressor which is surrounded by an outer wall.

Fink shows a contoured inner wall having an indentation to reduce drag at the juncture of the propeller with the spinner. Fink states this concept is equally adaptable to turbomachinery blading in order to alleviate local flow separation. However, there are significant aerodynamic performance differences between a turboprop with its array of airfoils only bounded by an inner wall (an unbounded cascade) and those which are bounded by an inner wall and an outer wall (bounded cascade).

With regard to bounded cascades, there are numerous examples of prior art in which the inner wall or the outer wall is contoured for aerodynamic considerations. These aerodynamic considerations include, for example, the aerodynamic efficiency of the airfoils, the flow losses experienced by the gases as the gases pass through the array of airfoils, and the choke flow characteristic of the array. The choke-flow characteristic is the level of pressure ratio across an array of airfoils above which an increase in pressure ratio does not increase flow through the array.

Examples of bounded cascade constructions are shown in U.S. Pat. No. 2,735,612 issued to Hausammann entitled "Blade Passage Construction for Compressors and Diffusers" which has projections into the flowpath for working medium gases resulting in a concave-convex wall path adjacent to the airfoil. U.S. Pat. No. 2,846,137 issued to Smith entitled "Construction for Axial-Flow Turbo Machinery" has a convex-concave shape or a concave-convex shape with respect to the flowpath at the end walls of the airfoils. U.S. Pat. No. 2,918,254 issued to Hausammann discloses a projection extending on the end wall from the pressure side to the suction side of the airfoil, the projection extending in the rearward direction. U.S. Pat. No. 2,955,747 issued to Schwaar entitled "Supersonic Axial Compressors" discloses adjacent rotor stages having the end walls of the adjacent stages angled with respect to each other. U.S. Pat. No. 4,371,311 issued to Walsh entitled "Compression Section for an Axial Flow Rotary Machine" has end walls that are curved with respect to the rotor and stator stages to form concave-convex regions at the end wall with respect to the flowpath upstream and downstream of the airfoil stage. German Patent Number 579989 "Blading of Axially Loaded Steam or Gas Turbines Without Head Rings" discloses end walls having angled flowpaths with either a concave or convex region at the leading edge of the airfoil. United Kingdom Patent 596,784 entitled "Improvements in and Relating to Elastic Fluid Turbines" discloses airfoils having a curved end wall.

These constructions for bounded cascades illustrate the many uses of curved surfaces extending in the axial direction along the end wall to influence the flow characteristics of an array of airfoils. The above art notwithstanding, scientists and engineers working under the direction of Applicants assignee have sought to develop airfoils which have increased efficiency and reduced aerodynamic losses in airfoil regions adjacent the walls which bound the flowpath for working medium gases.

SUMMARY OF INVENTION

This invention is in part predicated on the recognition that placing a concave region in the mid-chord region of the end wall increases the choke flow characteristic of the array of airfoils. And, more importantly, it enables the creation of a convex surface at the leading edge and a convex surface at the trailing edge which allows more design flexibility in aligning the incoming flow with the leading edge for increased aerodynamic efficiency and less flow losses in the trailing edge region as the flow exits the airfoil.

According to the present invention, the compression section of a rotary machine includes a flowpath wall extending rearwardly between a pair of flow directing surfaces, such as airfoils, the wall having a first region convex toward the flowpath that extends laterally from leading edge to leading edge, a second region convex toward the flowpath which extends from a trailing edge, and a third region concave toward the flowpath which extends from the first region to the second region and from airfoil to airfoil at a location adjacent the laterally thickest portion of the airfoil to enable creation of the convex regions.

In accordance with one embodiment of the present invention, the first convex region, the second convex region, and the concave region respectively have their maximum extent (a point of zero slope) in close axial proximity to the leading edge, the trailing edge and the thickest portion of the airfoil as measured with respect to the line of intersection of a radial plane containing the axis of the engine and a conical surface passing through the leading edge and trailing edge at the wall.

A primary feature of the present invention is a contoured wall. The contoured wall bounds a passage through a pair of airfoils. The contoured wall has a region concave in the rearward direction with respect to the flowpath between the leading edge and the trailing edge. Another primary feature of the contoured wall is the convex region between the concave region and the trailing edge. Still another primary feature of the contoured wall is a convex region between the concave region and the leading edge. In one embodiment, the maximum extent of the concave region is axially aligned with the laterally thickest portion of the airfoil.

A principal advantage of the present invention is the level of engine efficiency which results from utilizing an array of airfoils having, for a given choke flow characteristic, a leading edge region aligned more effectively to the incoming flow, and a trailing edge region having less viscous flow losses in comparison to the same airfoils bounded by a conical wall. Another advantage in one embodiment is the engine efficiency which results from a monolithic diffusion characteristic on the suction side surface which is a function of the axial location of the concave region between the convex regions.

The foregoing and other features and advantages of the present invention will become more apparent in the light of the following detailed description of preferred embodiments thereof as discussed and illustrated in the accompanying drawings.

BEST MODE FOR CARRYING OUT THE INVENTION

Figure 1:
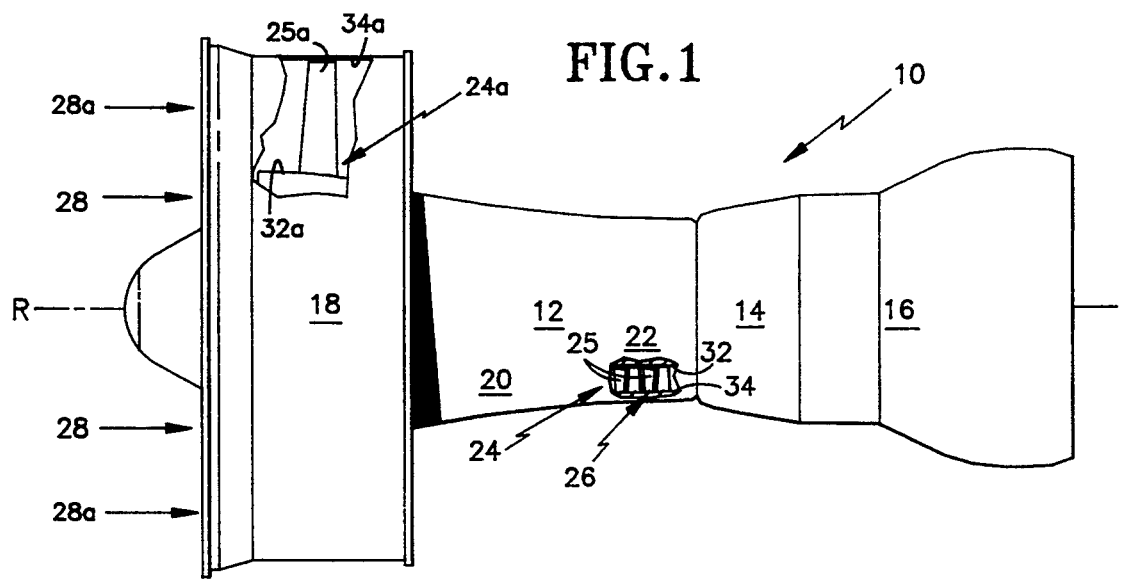
FIG. 1 is a simplified, side-elevation view of a turbofan gas turbine engine with the outer case broken away to show a portion of the rotor and stator assemblies in two of the compressor sections of the engine.

A turbofan gas turbine engine embodiment 10 of the present invention is illustrated in FIG. 1. The principal sections of the engine are a compression section 12, a combustion section 14, and turbine section 16. The compression section includes a fan compressor 18, a low pressure compressor 20, and a high pressure compressor 22. The engine has an axis R.

Rotor assemblies, as represented by the rotor assembly 24, 24a having rotor blades 25, 25a extend axially through the compression section 12 and the turbine section 16. A stator assembly 26 circumscribes the rotor assemblies. Annular flowpaths 28, 28a for working medium gases extend axially through the compressor sections and are bounded by portions of the stator assembly and the rotor assembly. These components form an inner wall 32, 32a and an outer wall 34, 34a for the annular flowpaths.

Figure 2:
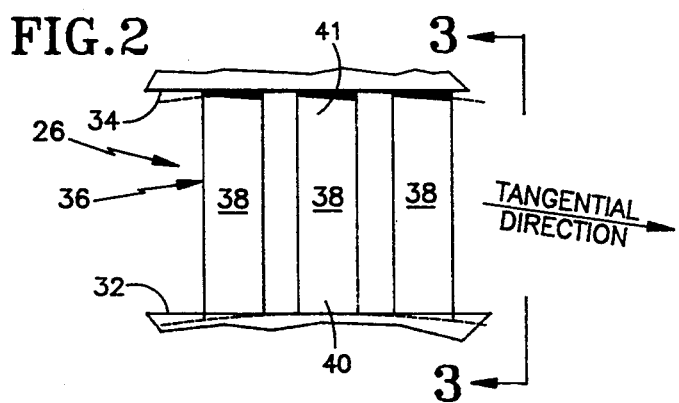
FIG. 2 is a developed view from an upstream location of a portion of a flow directing assembly of a gas turbine engine showing a concealed portion of the rotor stator assembly of FIG. 1.

FIG. 2 shows a portion of the stator assembly of FIG. 1 and in particular shows a portion of the compressor stator vanes 36 which are a portion of the flow directing assembly of the gas turbine engine. The broken line shows the embodiment in an undeveloped (circumferentially extending) view. The solid lines show the embodiment in a developed view.

The compressor stator vane 36 includes the inner wall 32, the outer wall 34, and an array of airfoils, as represented by the airfoils 38, extending between the inner wall and the outer wall. Each airfoil has an inner end 40 and an outer end 41. The flowpath for working medium gases extends between the adjacent airfoils. Each airfoil has a convex surface or side such as the suction side surface 42, and a concave surface or side such as the pressure side surface 44.

Figure 3:
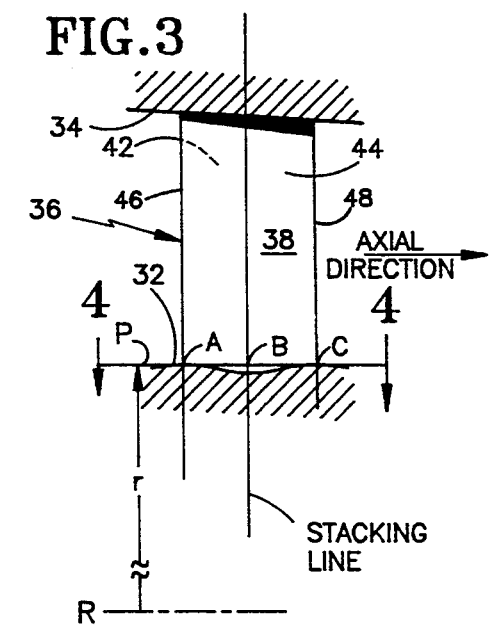
FIG. 3 is a side-elevation view of a compressor taken along the line 3—3 as shown in FIG. 2.

As shown in FIG. 3, the inner wall 32 has a special contour which increases the choke-flow characteristic of the assembly. The suction surface 42 and the pressure surface 44 of each airfoil are joined together at a leading edge 46 and a trailing edge 48. The contoured wall extends between the edges. An imaginary conical surface P extending about the axis R in the engine (planar in FIG. 2 because it is a developed view) extends through the intersection of the leading edge with the inner wall at an imaginary point A. Point A has a radius r about the axis R of the engine. Similarly, an imaginary point B lies on the suction side, at the circumferentially thickest portion of the airfoil. An imaginary point C lies on the trailing edge at the intersection of the trailing edge with the wall. The three points define the conical surface plane P at 4—4 which is planar in FIG. 2. The plane P passes through each airfoil and forms a conical airfoil section. The airfoil is defined by a family of these airfoil sections. The plane P provides a reference plane with respect to the contoured wall. The contour of the wall changes rearwardly but the contour does not change circumferentially.

Figure 4:
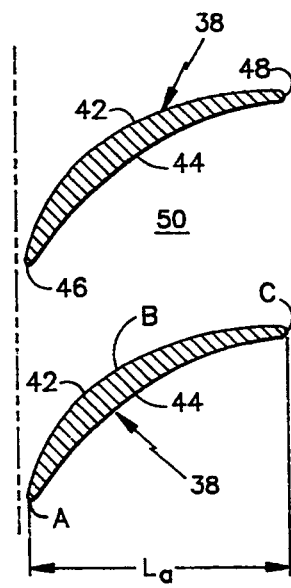
FIG. 4 is a sectional view of two adjacent airfoil sections taken along the line 4—4 of FIG. 3.

FIG. 4 is a developed sectional view of two adjacent airfoil sections taken along the line 4—4 of FIG. 3. A passage 50 extends rearwardly between the circumferentially spaced airfoils 38 and the inner wall 32 and the outer wall. The axial (rearward) distance of the passage extends circumferentially (laterally) from the suction surface 42 of one airfoil to the pressure surface 44 of the adjacent airfoil.

Figure 5:
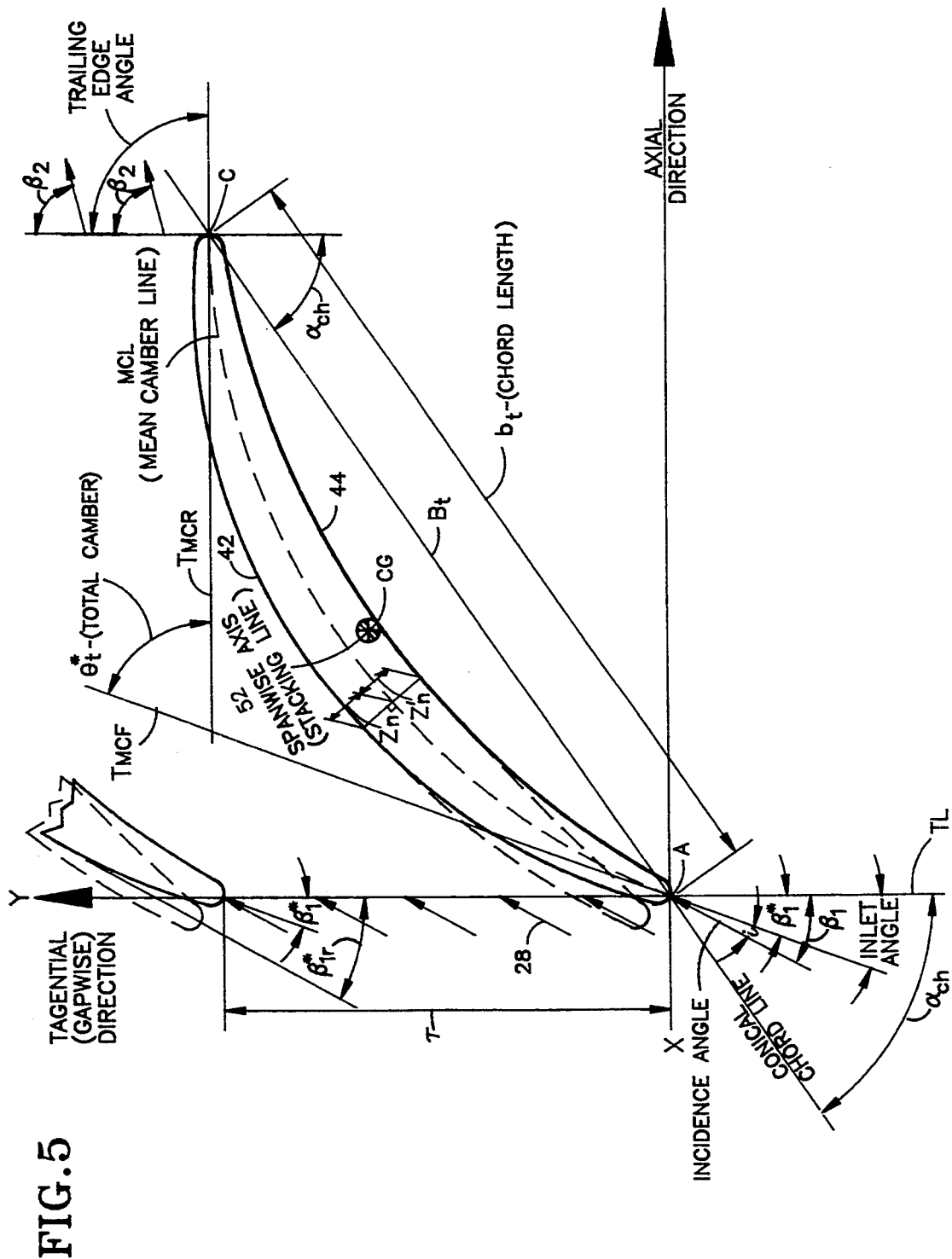
FIG. 5 is an enlarged view of the sectional view of FIG. 4.

FIG. 5 is an enlarged view of the sectional view taken in FIG. 4. A conical chord line $B_t$ is a straight line connecting point A on the leading edge with point C on the trailing edge. The conical chord line $B_t$ has a length $b_t$. A mean camber line MCL connects the point A on the leading edge and the point C on the trailing edge. The suction surface 42 and the pressure surface 44 are spaced a predetermined distance from the mean camber mean line along lines $Z_n$, measured perpendicular to the mean camber line. The center of gravity CG of the airfoil section is the locating reference for the airfoil in the rotary machine. A spanwise axis 52 or stacking line in the airfoil 38 extends spanwisely through the center of gravity of each airfoil section, locating the airfoil sections with respect to each other in the spanwise direction and chordwisely in the circumferential and axial directions. In the embodiment shown, the circumferentially thickest portion of the airfoil is at the stacking line. In other embodiments, it may be upstream or downstream of the stacking line.

A forward tangent line TL, tangent to a circle formed by a radial line passing through the axis R of the engine and through point A, provides a reference axis (y axis) for measuring angles and distances. A plane passing through and containing the axis of rotation R intersects the plane P at a second reference line, the x axis. $\tau$ is the distance between the airfoil sections measured along the forward tangent line TL. An alpha chord angle, $\alpha_{ch}$, is the angle between to the tangent line TL and the conical chord line $B_t$.

The working medium gas flowing along the working medium flowpath 28 approaches the airfoil section at an angle $\beta_1$ to the tangent line TL. The cambered mean line MCL has a tangent line $T_{MCF}$ at the leading (front) edge. The angle between the tangent line $T_{MCF}$ and the tangent line TL is the inlet metal angle $\beta^*_1$. The difference between the inlet metal angle $\beta^*_1$ and the angle of the working medium gases $\beta_1$ is the incidence angle i of the working medium gases. As shown in FIG. 5, the incidence angle i is negative.

The working medium gas leaves the airfoil at an angle $\beta_2$ to the rear tangent line TLR. The cambered mean line MCL has a tangent line $T_{MCR}$ at the trailing (rear) edge. A total camber angle $\theta^*_t$ is the angle between the Tangent Line $T_{MCF}$ at the leading edge and the Tangent Line $T_{MCR}$ at the trailing edge. The total camber angle $\theta_t$ is the measure of the curve of the cambered mean line and the airfoil section.

Figure 6:
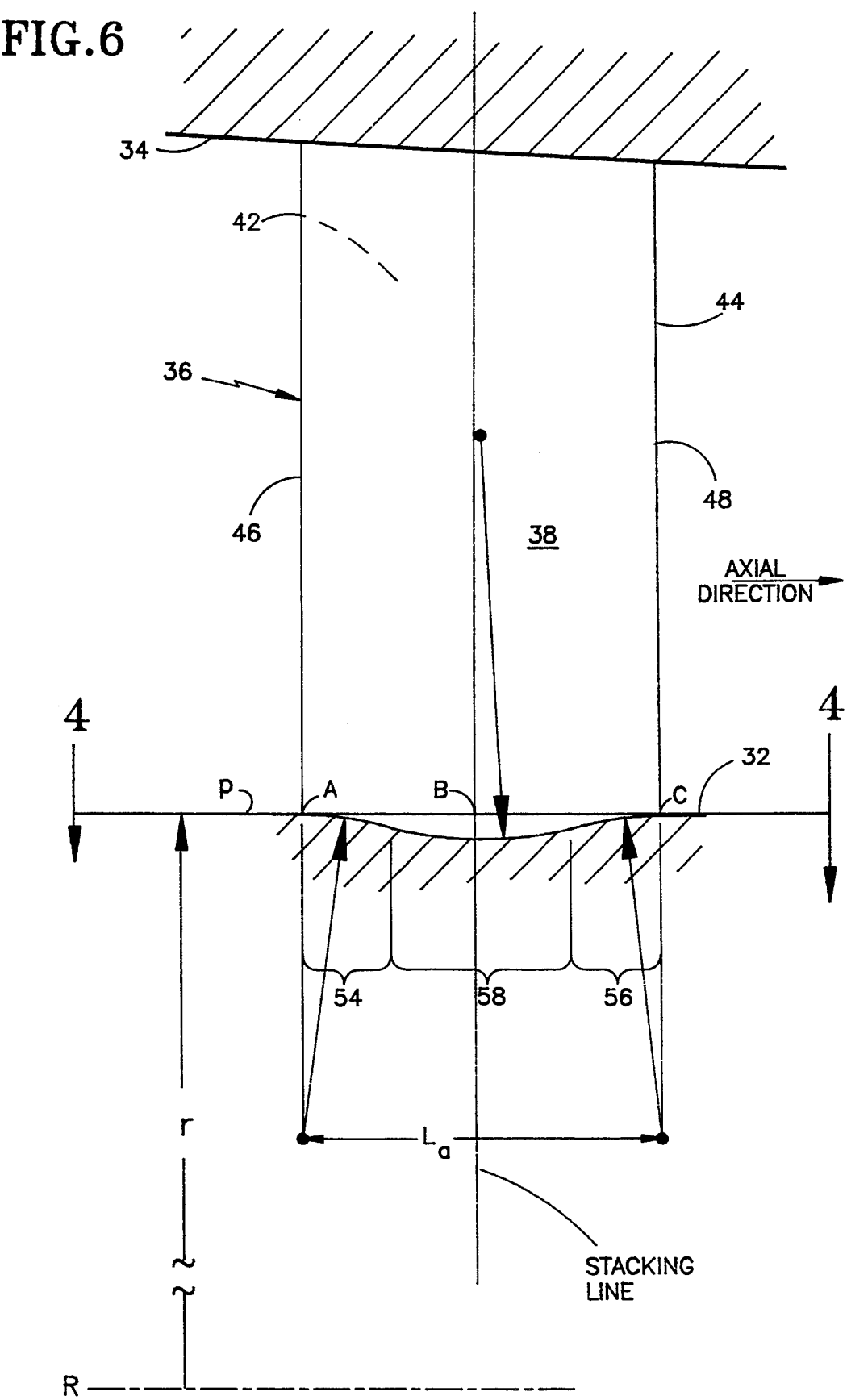
FIG. 6 is an enlargement of a portion of the side-elevation view of FIG. 3.

FIG. 6 is an enlarged view of a portion of the side-elevation view of FIG. 3, showing the suction surface 42 and the pressure surface 44. As shown in FIG. 4, the suction surface 42 and the pressure surface 44 diverge rearwardly in the downstream direction to the point of maximum thickness B at the stacking line and converge toward the trailing edge, decreasing the thickness of the trailing edge. The wall, as represented by the inner wall 32, extends axially and circumferentially between the airfoil sections and between the leading edge 46 and the trailing edge 48 and beyond. The wall has a first region 54 which extends circumferentially (laterally) from leading edge to leading edge and downstream (rearwardly) a distance which is less than or equal to one-fourth of the axial length $L_a$ from the leading edge to the trailing edge. The wall is convex towards the flowpath in the first region. As used herein, the term convex means that the wall bulges toward the flowpath and a tangent to any point which traces the curve is on the curve or on the flowpath side of the curve. The inner wall in the first region is tangent to the inner wall immediately upstream of the leading edge or it is tangent to a small extension of the inner wall extending in a straight line past the leading edge in the downstream direction. Radius of curvatures are indicated for the contoured regions of the wall. As will be realized, a point of inflection marks the boundary between convex and concave regions.

In other constructions, the inner wall 32 immediately upstream of the leading edge 46 might extend slightly outward in a convex fashion to the inner wall between the airfoils at the leading edge. In either event, the first convex region has its maximum extent toward the flowpath (that is, a point of zero slope) at the leading edge as measured with respect to the line of intersection of the radial plane containing the axis of the engine and the conical surface P passing through the leading edge and trailing edge at the wall. Thus, the inner wall upstream of the leading edge will not extend through this conical plane P, at least for one-half of the distance between this array of airfoils and the upstream array of airfoils.

The inner wall 32 has a second region 56 which extends from trailing edge 48 to trailing edge 48 in the embodiment shown and extends upstream a distance which is less than or equal to one-fourth of the axial length $L_a$. The wall is convex toward the flowpath in the second region as is the wall in the first region. The second convex region has its maximum extent at the trailing edge (that is, a point of zero slope) and like the first region, is tangent to the line of extension to the inner wall from a point immediately downstream of the trailing edge or a slight extension of the inner wall past the trailing edge into the array of airfoils. In either event, the inner wall does not pass through the conical surface P for at least half of the distance between this array of airfoils and the adjacent array of airfoils in the downstream direction.

In other embodiments, the trailing edge convex surface may extend only part-way from airfoil to airfoil, resulting in a contour in the circumferential direction. These embodiments will be more difficult to manufacture. It is believed that almost all uses of this concept will employ a convex region which extends circumferentially without contour from the suction surface 42 of one airfoil to the pressure surface 44 of the adjacent airfoil.

The inner wall has a third region 58 which extends from the first region 54 to the second region 56 and circumferentially from airfoil to airfoil. The wall in the third region is concave toward the flowpath, that is, bulges away from the flowpath and a point which traces the curve of the second region has a tangent line, at any point that varies and will always lie on the curve (if flat) or on the side of the curve away from the flowpath. The second region will have its maximum extent adjacent point B which is the circumferentially thickest portion of the airfoil. The maximum extent of the second region is measured with respect to the conical surface P passing through the leading edge and the trailing edge at the wall. At the location of maximum extent, the contour will have a point of zero slope as measured with respect to the intersection of the radial plane containing the axis R of the engine and the conical surface P.

In other constructions, the location of the maximum extent of the surface might be slightly forward or slightly aft of the maximum thickness of the airfoil. This axial location may be adjusted to cause the velocity distribution with chord length on the suction surface to be monotonic once the flow passes through its maximum amplitude. This will be discussed in more detail with respect to the construction of the airfoil shown in FIG. 7 and FIG. 8.

Figures 7, 8:
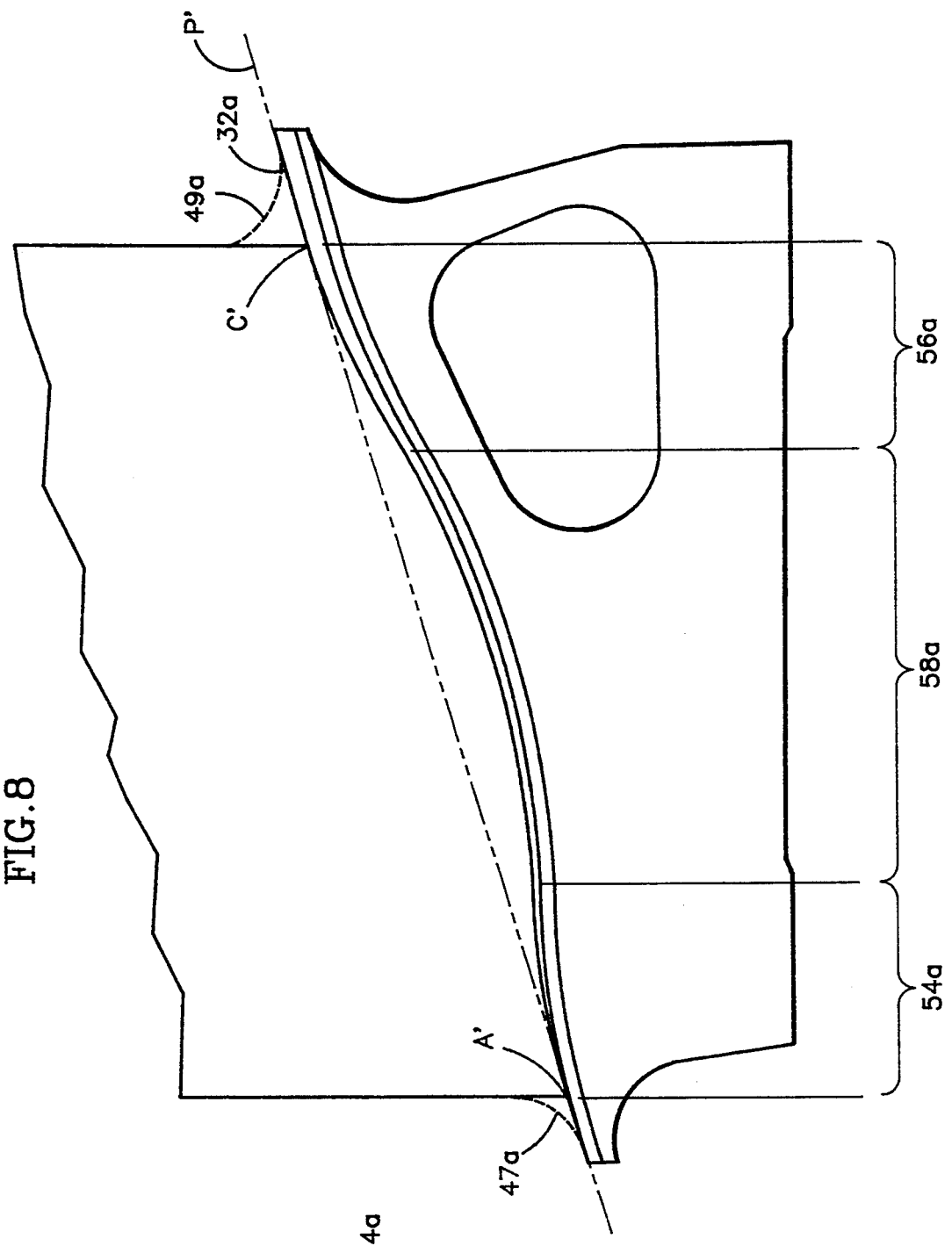
FIG. 7 is a side-elevation of a fan rotor blade of the fan compressor.
FIG. 8 is an enlargement of a portion of the side elevation view shown in FIG. 7.

FIG. 7 is a side-elevation view of another embodiment of a flow directing surface, as represented by the fan rotor airfoil (blade) 38a of the fan compressor 18. In the particular embodiment shown, the inner wall 32a is formed by the platform of the rotor blade. The outer wall 34a is formed by the circumferentially extending outer fan case and is spaced radially from the rotor blade.

FIG. 8 is an enlarged side-elevation view of the inner wall 32a of the fan rotor blade. As with the inner wall of the stator vane shown in FIG. 6, the inner wall has a first region 54a which extends circumferentially from the leading edge to the leading edge of adjacent blades. The first region extends downstream a distance which is less than or equal to one-fourth of the axial length $L_a$ from the leading edge to the trailing edge. The wall is convex in the axial direction towards the flowpath in the first region. The wall has a second region 56a which extends from trailing edge to trailing edge and upstream a distance which is less than or equal to one-fourth of the axial length $L_a$. The wall is convex in the axial direction toward the flowpath in the second region.

The wall 32 has a third region 58a. The third region extends axially from the first region to the second region and circumferentially from airfoil to airfoil. The wall in the third region is concave in the axial direction toward the flowpath. The first convex region, the second convex region and the third concave region respectively have their maximum extent (a point of zero slope) in close proximity to the leading edge, the trailing ledge, and the thickest portion of the airfoil as measured with respect to the line of intersection of a radial plane containing the axis of the engine and the conical surface P' passing through the leading edge 46a and trailing edge 48a at the wall. The point of maximum extent also is at the leading edge and the trailing edge, either being a slightly flat portion tangent to the convex surface or the curved portion of the convex surface at the leading edge and at the trailing edge.

As shown by the dotted lines in FIG. 8, there is a slight fairing 47a, 49a between the leading edge and the trailing edge and the platform. The fairing is not considered during analytical design of the airfoil sections. The leading edge 46a and trailing edge 48a extend as shown in a straight line intersecting the conical surface P' tangent to the inner wall at the trailing edge and leading edge at points A' and C'. As will be realized, other constructions might have a inner wall upstream of the leading edge or an inner wall downstream of the trailing edge which continue the convex curve past the point of maximum extent. It is believed that such constructions will perform substantially similar to those constructions in which the inner wall upstream of the leading edge and the outer edge downstream extending trailing edge are uncontoured surfaces in the axially extending direction. In no event will the inner wall upstream of the leading edge and downstream of the leading edge extend through the conical reference place P'.

Figure 9:
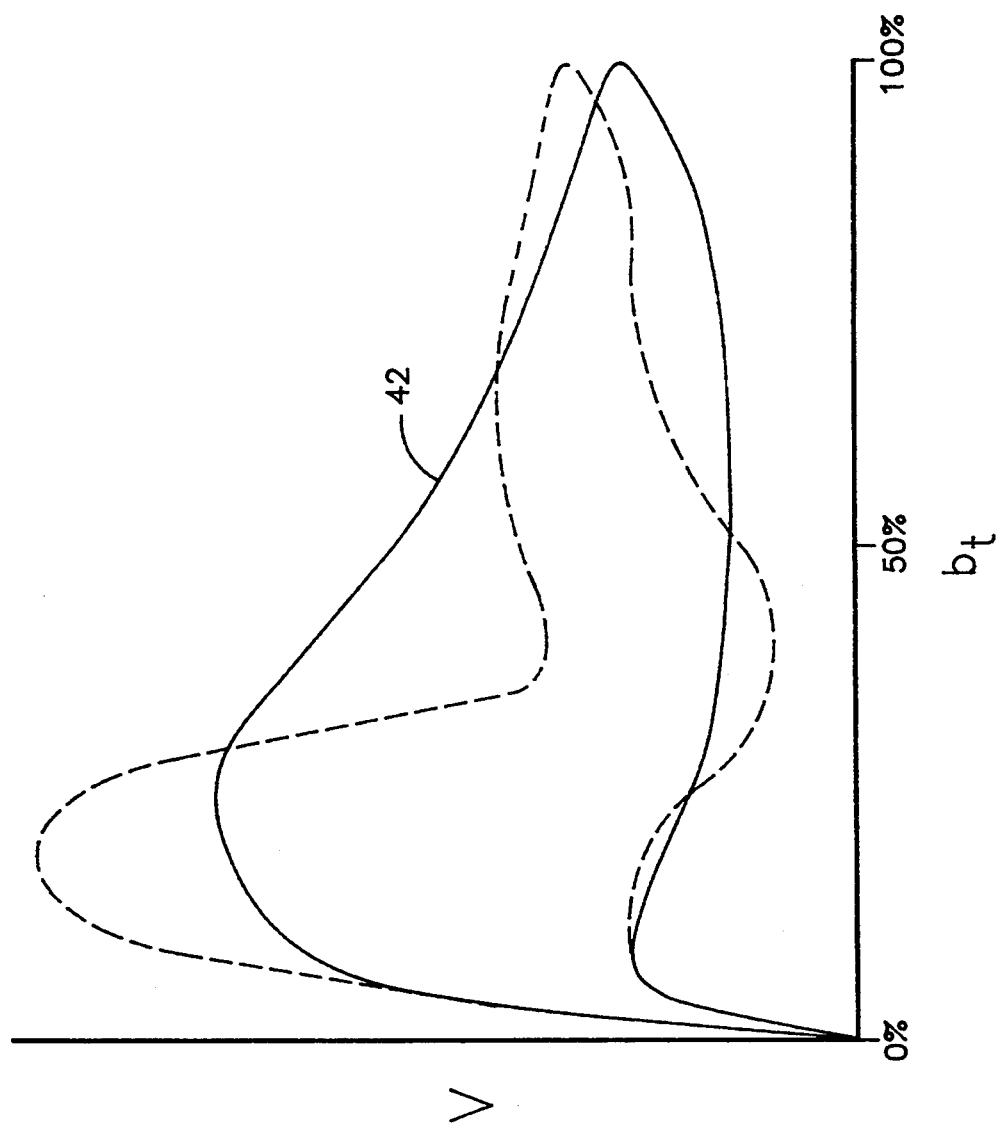
FIG. 9 is a graphical representation of local velocity at the suction surface and pressure surface.

FIG. 9 is a graphical representation of the local velocity on the suction side surface and the pressure side surface of the airfoil shown in FIG. 7 at a location adjacent the inner wall and as a function of the conical chord length $b_t$ under an operative condition at which the engine spends a significant portion of its operative condition, such as the maximum cruise condition. Under operative conditions (as shown in full), the velocity on the suction surface rapidly increases to a peak value and decreases to the trailing edge region. As shown, the curve is monotonic, that is, the slope of the curve is always negative from the point of the maximum value of velocity. The airfoil has a monotonic suction surface characteristic. Such an airfoil exhibits better aerodynamic performance (because it has less losses associated with the diffusion of the flow) than do airfoils having a velocity distribution on the suction surface which is not monotonic.

An example of a velocity distribution that is nonmonotonic is shown by the dotted lines. This velocity distribution increases rapidly to a maximum. The velocity then decreases rapidly in the rearward direction and then increases, changing the slope of the velocity curve from negative to positive toward the trailing edge of the airfoil. Such a curve exemplifies a construction having large aerodynamic losses as the flow passes through the array of airfoils. The shape of the curve and the monotonic nature of the curve may be influenced by moving the concave region of the wall either forwardly or rearwardly, depending on the particular airfoil under consideration. The tools for analyzing velocity distributions such as these are well known in the field of compressor design. As will be realized, whether the airfoil has a monotonic suction surface characteristic, using the convex surfaces of the first region and the second region will improve the aerodynamic performance of the array as compared to constructions having the same characteristic but not having the convex surfaces.

During operation of the gas turbine engine 10 shown in FIG. 1, working medium gases are flowed along the working medium flow paths 28, 28a. As the gases enter the compression section, the concave third regions 58, 58a of the airfoil provide additional cross-sectional area to the flow. The additional flow area offsets the decrease in cross-sectional flow area caused by the increasing thickness of the airfoil in the rearward direction. This ensures a suitable choke-flow characteristic for the airfoil.

More importantly, the concave region enables the creation of a convex region at the trailing edge and a convex region at the leading edge. At the leading edge, the convex region increases the axial velocity of the flow between the airfoils in passage 50, decreasing static pressure, and pulling more flow into the leading edge region. This causes the flow to move into closer alignment with the airfoils, reducing the incidence angle of the flow on the blade and reducing aerodynamic losses on the airfoil. It also reduces the suction side velocity spike further increasing the aerodynamic efficiency. The additional flow also aids in avoiding stall under conditions of take off and maximum climb.

Moreover, for a given minimum level of choke-flow characteristic (as illustrated by and associated with the dotted line leading edge and the leading edge in full in FIG. 5), the inlet metal angle may vary between the dotted and in full outlines of the airfoil. As will be realized, this permits closing down the array of airfoils (or opening them with more choke-flow characteristics) if necessary to align the leading edge with the incoming flow without a loss of choke-flow characteristic below that which is acceptable for the overspeed capability of the engine.

The most important advantage occurs at the trailing edge region where circumferential flow exists in the end wall region. The circumferential flow is commonly referred to as the passage vortex and extends from the higher pressure, pressure surface to the lower pressure, suction surface. The effect of the passage vortex in rotor blades is reinforced by the radial pumping force exerted by the fan blades on the viscous flow. There are significant aerodynamic losses associated with the passage vortex.

As noted, the concave region permits the formation of the convex region at the trailing edge of the blade. The creation of the convex region increases the velocity of the flow in passage 50 at the end wall, decreases the static pressure, and pulls additional flow into the trailing edge region. This is important because the additional flow into the boundary layer of the passage disrupts the passage vortex and decreases the aerodynamic losses associated with the vortex.

In summary, the aerodynamic efficiency of a rotor blade, or of a stator vane, is increased by the better alignment of the flow with the leading edge and the ability of the designer to adjust the angle of the leading edge with respect to the flow by reason of the improved choke-flow characteristic of the array of airfoils. In addition, there is a decrease in aerodynamic losses at the trailing edge.

Although the invention has been shown and described with respect to detailed embodiments thereof, it should be understood by those in the art the various changes in form and detail thereof may be made without departing from the spirit and the scope of the claimed invention.

We claim:

1. A flow directing assembly for a rotary machine having a flowpath for working medium gases, the assembly including a first wall and a second wall which bound the flowpath and at least one pair of airfoils, each of which has a suction surface and a pressure surface, each of which has a leading edge and a trailing edge, and each of which extends across the flowpath leaving a rearwardly extending passage therebetween for working medium gases that is bounded laterally in a direction perpendicular to the rearward direction by the airfoils and bounded spanwisely by the walls, which comprises:

the first wall having a first region extending rearwardly from the leading edge, the wall in the first region being convex toward the flowpath in the rearward direction from the leading edge, the first region extending laterally from the suction surface of the first airfoil to the pressure surface of the second airfoil;

a second region extending forwardly from the trailing edge, the wall in the second region being convex toward the flowpath in the forward direction from the trailing edge, the second region extending laterally from the suction surface of the first airfoil toward the pressure surface of the second airfoil;

a third region extending between the first region and the second region, the third region being concave toward the flowpath in the forward and rearward directions and extending laterally from the suction surface of the first airfoil to the pressure surface of the second airfoil.

2. The flow directing assembly of claim 1 wherein the second region extends laterally from the suction surface of the first airfoil to the pressure surface of the second airfoil.

3. The flow directing assembly of claim 1 wherein the passage extends rearwardly a length $L_a$ from the leading edge to the trailing edge and wherein the first convex region extends from the leading edge for a length which is less than or equal to one-fourth of the length $L_a$.

4. The flow directing assembly of claim 2 wherein the passage extends rearwardly a length $L_a$ from the leading edge to the trailing edge and wherein the first convex region extends from the leading edge for a length which is less than or equal to one-fourth of the length $L_a$.

5. The flow directing assembly of claim 4 wherein the airfoil has a maximum circumferential thickness at a first axial location and wherein the concave surface has an extent away from the flowpath and wherein the maximum extent away from the flowpath of the concave surface is adjacent the first axial location as measured with respect to a circumferentially extending conical reference plane P passing through the intersection of the leading edge and the first wall and the trailing edge and the first wall of the airfoil.

6. The flow directing assembly of claim 5 wherein the convex surface has an extent toward the flowpath and wherein the maximum extent of the convex surface in the second region toward the flowpath is at the trailing edge as measured with respect to the reference plane P.

7. The flow directing assembly of claim 6 wherein the maximum extent of the convex surface in the first region toward the flowpath is at the leading edge as measured with respect to the reference plane P.

8. The flow directing assembly of claim 6 wherein the assembly is a stator assembly and wherein each airfoil is attached to the first wall and to the second wall.

9. The flow directing assembly of claim 6 wherein the assembly is a rotor assembly and wherein the airfoils are attached to the first wall and are spaced radially from the second wall and wherein the first wall has said regions.

10. A flow directing assembly for a compression section of a rotary machine which extends circumferentially about an axis R, which has a working medium flowpath, and which has an upstream end and a downstream end which comprises:

an outer wall extending circumferentially about the axis R, an inner wall spaced radially from the outer wall leaving an annular passage for working medium gases extending therebetween, a plurality of airfoils spaced circumferentially and extending radially across the working medium flow path, each airfoil having an inner end, an outer end, a spanwise axis extending between the ends, and a plurality of airfoil sections disposed about the spanwise axis, each airfoil section having an aerodynamic surface and having a leading edge, a trailing edge, a pressure surface, and a suction surface extending from the leading edge to the trailing edge which form the aerodynamic surface of the airfoil, the suction surface, and the pressure surface having a thickness therebetween and diverging in the downstream (chordwise) direction from the leading edge increasing the circumferential thickness to a maximum and converging thereafter decreasing the thickness to the training edge;

wherein at least one of said airfoils extends from at least one of the walls, said wall from which the airfoil extends extending axially and circumferentially between the airfoils and between the leading edge and the trailing edge, the wall from which the airfoil extends having a first region which extends circumferentially from leading edge to leading edge and downstream a distance which is less than or equal to one-fourth of the axial length $L_a$ from leading edge to trailing edge, the wall being convex toward the flowpath in the first region; the wall having a second region which extends from trailing edge to trailing edge and extends upstream a distance which is less than or equal to one-fourth of the axial length $L_a$, the wall being convex toward the flowpath in the second region;

the wall having a third region which extends from the first region to the second region and circumferentially from airfoil to airfoil, the wall in the third region being concave toward the flowpath; and, wherein the convex region, the second convex region, and the concave region, respectively, have their maximum extent (a point of zero slope) at the leading edge, the trailing edge, and the thickest portion of the airfoil as measured with respect to the line of intersection of a radial plane and a conical surface passing through the leading edge and trailing edge at the wall.

* * * * *